(12) United States Patent
Greenblatt

(10) Patent No.: US 9,969,446 B2
(45) Date of Patent: May 15, 2018

(54) SPACE-SAVING BICYCLE RACK

(71) Applicant: Everlast Climbing Industries, Inc., Mendota Heights, MN (US)

(72) Inventor: Joel Greenblatt, Wauwatosa, WI (US)

(73) Assignee: EVERLAST CLIMBING INDUSTRIES, INC., Minneapolis, MN (US)

( * ) Notice: Subject to any disclaimer, the term of this patent is extended or adjusted under 35 U.S.C. 154(b) by 0 days. days.

(21) Appl. No.: 14/665,656

(22) Filed: Mar. 23, 2015

(65) Prior Publication Data

US 2016/0280296 A1    Sep. 29, 2016

(51) Int. Cl.
*B62H 3/00* (2006.01)
*B62H 3/02* (2006.01)
*F16M 13/02* (2006.01)
*F16M 11/08* (2006.01)
(Continued)

(52) U.S. Cl.
CPC ............. *B62H 3/00* (2013.01); *B62H 3/02* (2013.01); *B62H 2700/00* (2013.01); *F16C 11/045* (2013.01); *F16C 11/10* (2013.01); *F16C 2223/30* (2013.01); *F16C 2240/30* (2013.01); *F16M 11/08* (2013.01); *F16M 13/02* (2013.01); *F16M 2200/024* (2013.01)

(58) Field of Classification Search
CPC ... B62H 3/12; B62H 3/00; B62H 3/02; B62H 3/04; B62H 3/08; B62H 2700/00; Y10T 70/5876; Y10T 70/5881; F16M 2200/024; F16M 11/08; F16M 11/045; F16C 11/045; F16C 11/10; F16C 2223/30; F16C 2240/30

USPC ....................................................... 211/17–24
See application file for complete search history.

(56) References Cited

U.S. PATENT DOCUMENTS 570,465 A * 11/1896 Dilley et al. ............. B62H 3/12
                                                                211/19
606,118 A *  6/1898 Bowman ................... B62H 3/00
                                                                211/18

(Continued)

FOREIGN PATENT DOCUMENTS

GB           2045707 A  * 11/1980  ............... B62H 3/02

*Primary Examiner* — Patrick D Hawn
(74) *Attorney, Agent, or Firm* — McAndrews, Held & Malloy, Ltd.

(57) ABSTRACT

The presently disclosed technology is related to an assembly for the parking of one or more bicycles that includes a mounting bracket and an arm. The mounting bracket is configured for attachment to a wall. The proximal end of the arm is pivotally attached to the mounting bracket and the distal end of the arm has at least one opening configured for the attachment of a bicycle lock. The assembly is configured so that the arm may be secured in at least two different types of positions. The first type of position is a space-saving position, to which a user may position the assembly when no bicycle parking is needed. In the space-saving position, the arm may be positioned so as to be substantially parallel with the wall to which the assembly is mounted. The second type of position is a locking position, to which a user may position the assembly when bicycle parking is needed. In the locking position, the arm may be positioned at an angle with the wall to which the assembly is mounted, the angle being suitable for the locking of at least one bicycle to the arm.

20 Claims, 2 Drawing Sheets

(51) Int. Cl.
*F16C 11/04* (2006.01)
*F16C 11/10* (2006.01)

(56) References Cited

U.S. PATENT DOCUMENTS

| | | | | |
|---|---|---|---|---|
| 618,507 A * | 1/1899 | Henderson et al. | ..... | B62H 3/00 211/19 |
| 639,517 A * | 12/1899 | Butcher | ..... | B62H 3/04 211/19 |
| 648,234 A * | 4/1900 | Brown | ..... | B62H 3/12 211/19 |
| 679,794 A * | 8/1901 | Sweet | ..... | B62H 3/12 211/19 |
| 764,774 A * | 7/1904 | Sargeant | ..... | B62H 3/12 211/18 |
| 4,008,587 A * | 2/1977 | Frentzel | ..... | E05B 71/00 211/18 |
| 5,447,241 A * | 9/1995 | Bureau | ..... | B62H 3/02 211/18 |
| 5,887,461 A * | 3/1999 | Heffley | ..... | B62H 3/02 211/5 |
| 6,588,603 B1 * | 7/2003 | West | ..... | B62H 3/04 211/19 |
| 6,877,706 B2 * | 4/2005 | Harrison | ..... | G10G 5/00 211/195 |

* cited by examiner

SPACE-SAVING BICYCLE RACK

BACKGROUND OF THE INVENTION

In many environments, especially urban environments, space that is reserved for the parking of bicycles is often limited. The presently disclosed technology seeks to address this problem by providing a space-saving bicycle rack. More particularly, the presently disclosed technology is directed to wall-mounted bicycle rack that may be pivoted so that, when not in use, it takes up little to no space.

SUMMARY OF THE INVENTION

Embodiments of the presently disclosed technology are related to an assembly for the parking of one or more bicycles. The assembly includes a mounting bracket and an arm. The mounting bracket is configured for attachment to a wall. The proximal end of the arm is pivotally attached to the mounting bracket and the distal end of the arm has at least one opening configured for the attachment of a bicycle lock. The assembly is configured so that the arm may be secured in at least two different types of positions. The first type of position is a space-saving position, to which a user may position the assembly when no bicycle parking is needed. In the space-saving position, the arm may be positioned so as to be substantially parallel with the wall to which the assembly is mounted. The second type of position is a locking position, to which a user may position the assembly when bicycle parking is needed. In the locking position, the arm may be positioned at an angle with the wall to which the assembly is mounted, the angle being suitable for the locking of a bicycle to the arm.

Embodiments of the presently disclosed technology are related to an assembly for the parking of one or more bicycles. The assembly includes a mounting bracket and an arm. The mounting bracket is configured for attachment to a wall. The proximal end of the arm is pivotally attached to the mounting bracket and the distal end of the arm has at least one opening configured for the attachment of a bicycle lock. The assembly is configured so that the arm may be secured in a plurality of positions, each position forming an angle with the wall to which the assembly is mounted. The arm may be secured in at least positions having angles corresponding to about 0°, about 45°, about 90°, about 135°, and about 180° from the wall.

Additional features and advantages will be set forth in the detailed description which follows, and in part will be readily apparent to those skilled in the art from that description or recognized by practicing the embodiments as described herein, including the detailed description which follows, the claims, as well as the appended drawings. It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

A clear conception of the advantages and features of one or more embodiments will become more readily apparent by reference to the exemplary, and therefore non-limiting, embodiments illustrated in the drawings.

DETAILED DESCRIPTION OF THE INVENTION

Figure 1:
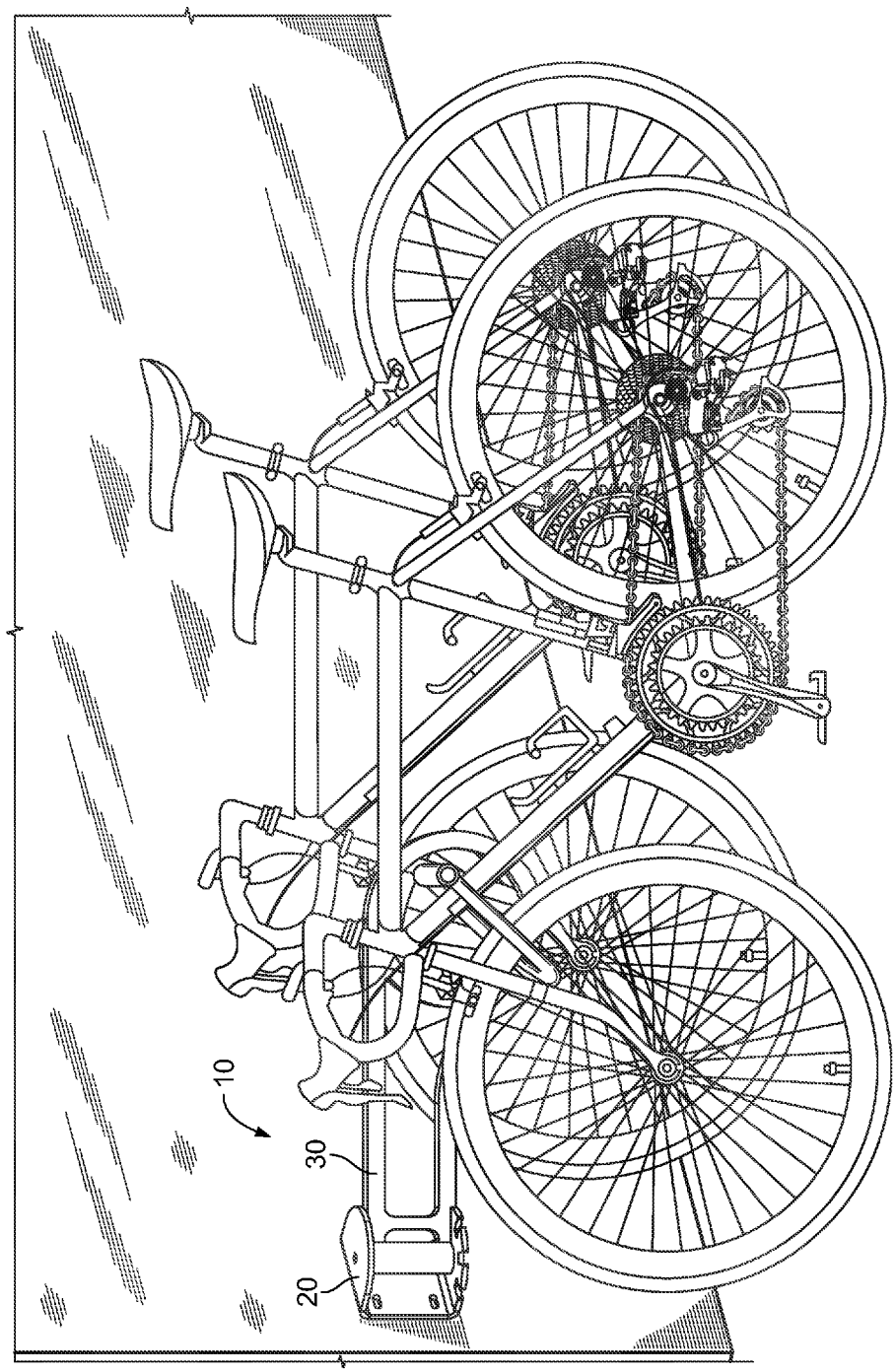
FIG. 1 is a perspective view of an assembly according to an embodiment of the present disclosure, the assembly being positioned in a locking position that forms an angle of about 45° with the wall to which the assembly is mounted, and used for the secured parking of two bicycles.

Reference will now be made in detail to certain embodiment(s), examples of which are illustrated in the accompanying drawings. Whenever possible, the same reference numerals will be used throughout the drawings to refer to the same or like parts.

Figure 2:
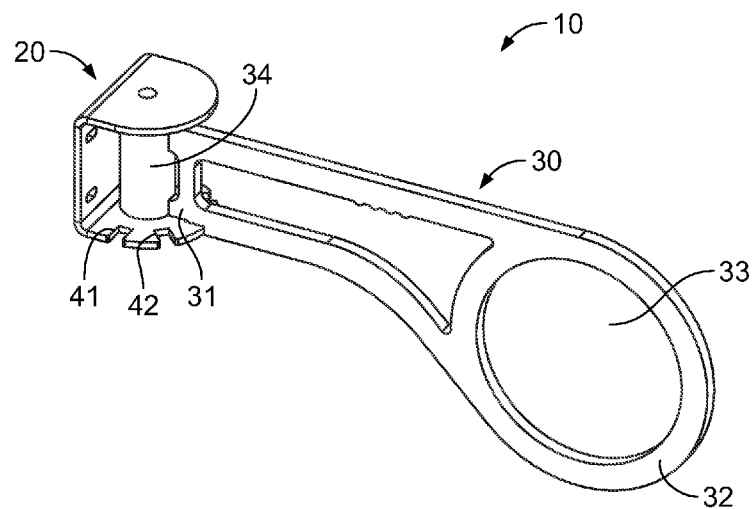
FIG. 2 is a perspective view of an assembly according to an embodiment of the present disclosure, the assembly being positioned in a locking position that forms an angle of about 90° with the wall to which the assembly is mounted.
Figure 3:
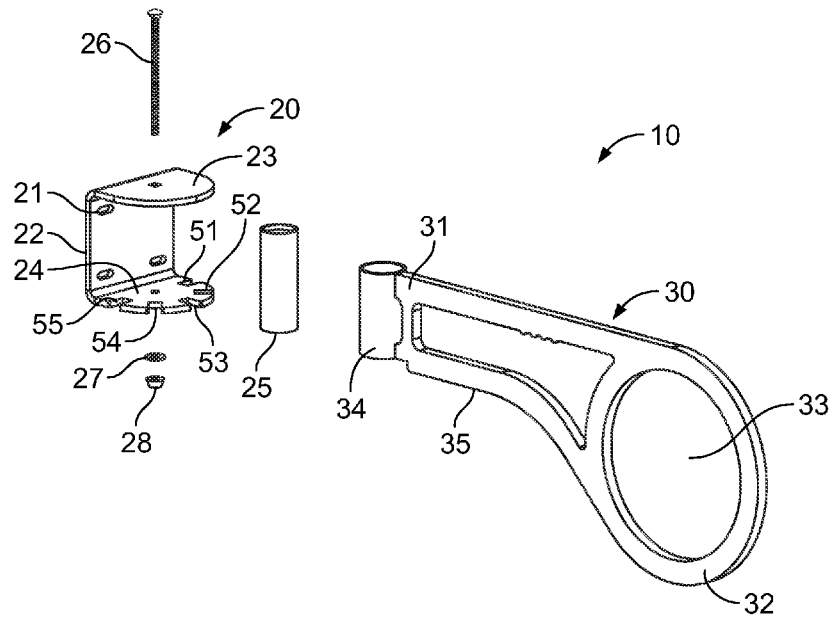
FIG. 3 is an exploded perspective view of an assembly according to an embodiment of the present disclosure.

An embodiment of the space-saving bicycle rack 10 of the present disclosure is shown in FIGS. 1 through 3. The space-saving bicycle rack assembly 10 comprises a mounting bracket 20 and an arm 30.

The mounting bracket 20 is configured for attachment to a wall. The mounting bracket 20 may be attached to the wall using any of a variety of known mechanisms. In some embodiments, for example, the mounting bracket 20 may have one or more, and preferably a plurality, of anchor holes 21. The anchor holes 21 may be used to attach the mounting bracket 20 to the wall using, for example, wedge anchors or sleeve anchors. Where the assembly 10 is to be mounted to a solid wall, such as a solid concrete wall, the use of wedge anchors may be more desirable. Where the assembly 10 is to be mounted to a hollow wall, such as a hollow concrete wall, sleeve anchors may be more desirable. Accordingly, it is preferable that the mounting bracket 20 may be configured to be mounted to the wall using either a wedge anchor or a sleeve anchor.

In some embodiments, the mounting bracket 20 comprises a mounting portion 22, an upper base plate 23, and a lower base plate 24. The mounting portion 22 is configured for attachment to a wall, such as through the inclusion of anchor holes 21 or the like. The upper base plate 23 and the lower base plate 24 may be configured to together provide for the mounting of the arm 30. For example, in some embodiments the mounting bracket 20 may be configured so that the arm 30 may be pivotally attached to the mounting bracket between the upper base plate 23 and the lower base plate 24. The mounting bracket 20 may also comprise a hinge pin 25, upon which the arm 30 is configured to pivot, i.e. swivel or rotate. In some embodiments, the hinge pin 25 may span between the upper base plate 23 and the lower base plate 24. The hinge pin 25 may be attached to the mounting bracket by any suitable fastener. For instance, in the embodiment shown in FIG. 3, the hinge pin 25 is configured to be attached to the mounting bracket 20 through the use of a bolt 26, washer 27, and nut 28. In some embodiments, the hinge pin 25 may be attached to the mounting bracket 20 with a tamper-resistant fastener, such as one that requires a special tool to remove.

The arm 30 comprises a proximal end 31 and a distal end 32. The proximal end 31 of the arm is configured to be pivotally attached to the mounting bracket 20. In some embodiments, the proximal end of the arm 31 includes one or more tubular portions 34, each of which surrounds the hinge pin 25, and which together provide for rotation of the arm 30 about the pin hinge. In the embodiment shown in FIG. 3, for example, the proximal end 31 of the arm comprises a single tubular portion 34.

In some embodiments, and for reasons that are more fully described later, it is important that the one or more tubular portions 34 are configured so that the proximal end 31 of the arm may be moved a small distance upward and downward along the axis of the hinge pin 25. Accordingly, depending on the manner in which the arm 30 is configured to pivot about the mounting bracket 20, it may be important that the one or more tubular portions 34 do not span the full height of the hinge pin 25. For example, the one or more tubular portions 34 may be configured to provide at least about 0.5 inches of movement along the axis of the hinge pin 25, alternatively at least about 0.75 inches of movement along the axis of the hinge pin, alternatively at least about 1.0 inches of movement along the axis of the hinge pin. In the embodiment shown in FIG. 3, for example, the tubular portion 34 of the arm has a height of about 4.5 inches, compared with the hinge pin 25 which has a height of about 5.25 inches.

The distal end 32 of the arm is configured for the attachment of one or more bicycle locks. For example, the distal end 32 of the arm may include one or more openings 33 through which a bicycle lock, such as a standard U-shaped lock (U-lock) or cable lock, can be inserted. In some embodiments, the distal end 32 of the arm may include an opening 33 that is suitable for the locking of two bicycles to the arm, one bicycle on either side as is shown in FIG. 1. The one or more openings 33 may have a variety of shapes and sizes. In some embodiments, including for example those shown in the Figures, the distal end 32 of the arm may have a single circular opening 33, the circular opening being dimensioned to accept locks at two positions such that two bicycles may be secured to the arm via locks without the two bicycles overly interfering with one another. In other embodiments, the distal end 32 of the arm may have multiple openings 33, each of which may serve to indicate to a user that a locking space is available and/or to ensure that the bicycles are locked to the arm in a manner so as to avoid undue interference between the two bicycles.

The arm may be made of a metal, such as steel, and may be laser cut. The steel may be provided with a galvanized finish in order to prevent rusting. In some embodiments, at least the distal end 32 of the arm may also be provided with a protective coating 35. The protective coating is designed to prevent the arm 30 from damaging any portion of the bicycle and/or the bicycle lock should undesirable movement of the bicycle or the arm occur. To provide maximum protection, the protective coating 35 may be supplied along substantially the entire length of the arm 30. It may however be desirable to leave the proximal end 31 of the arm uncoated, in order to avoid potential interference of the protective coating with the pivoting of the arm or with the securing of the arm in one or more positions. Any substantially soft coating material may be used as the protective coating 35. Thermoplastic coatings have been found to work well, for example, and may be designed in any of a variety of colors.

The dimensions of the arm 30 may be configured to maximize the amount of bicycles that may be locked to the assembly 10 while at the same time minimizing the footprint of the assembly. In some embodiments, for example, the length of the arm between the proximal end 31 edge and the distal end 32 edge may be less than forty inches, alternatively less than thirty-five inches, and alternatively less than thirty inches. Additionally, the vertical span between a top edge of the arm (at the highest point) and a bottom edge of the arm (at the lowest point) may be less than twenty inches, alternatively less than fifteen inches. In some embodiments, the distal end 32 of the arm may span a greater vertical height than the proximal end 31 of the arm. For example, in some embodiments, the arm may widen vertically along at least a portion of the arm toward the distal end 32. This widening may be useful to provide easy access to the one or more openings 33 for the attachment of bicycle locks while also minimizing the overall footprint of the arm (and the amount of material used to manufacture the arm). The arm may also have a thickness, or width, that is less than one and one-half inches, alternatively less than one inch.

The assembly 10 is configured so that the arm 30 may be pivoted to and secured in at least two, and preferably more than two, positions. At least one of the two or more positions is a space-saving position in which the arm 30 is substantially parallel with the wall to which the assembly is mounted. And at least one of the two or more positions is a locking position in which the arm 30 is positioned at an angle with the wall that is suitable for the locking of a bicycle to the arm so as to park the bicycle.

In some embodiments, the assembly 10 is configured so that the arm may be secured in a plurality of locking positions. For example, in some embodiments, the assembly 10 is configured so that the arm may be pivoted to and secured in at least two different locking positions. And in some embodiments, the assembly 10 is configured so that the arm may be pivoted to and secured in at least three different locking positions. Additionally, in some embodiments, the assembly 10 is configured so that the arm may be secured in a plurality of space-saving positions. For example, in some embodiments the assembly 10 is configured so that the arm may be pivoted to and secured in a first space-saving position and a second space-saving position, the first and second space-saving positions being located on opposing sides of the bracket (so that the arm 30 may be positioned to extend from the mounting bracket 20 substantially parallel to the wall in either direction).

The one or more locking positions may form a variety of angles with the wall to which the assembly 10 is mounted. For example, a locking position that forms a substantially 90° angle with the wall, i.e. is perpendicular with the wall, may be provided. Or, for example, a locking position that forms a substantially 45° angle with the wall may be provided. In some embodiments, the arm 30 may be pivoted to and secured at a space-saving position 41 that forms a substantially 0° angle with the wall, a first locking position that forms a substantially 45° angle with the wall, and a second locking position that forms a substantially 90° with the wall. In some embodiments, for example, the assembly 10 may be configured so that the arm 30 may rotate to a maximum angle of about 90°, i.e. perpendicular to the wall.

In order to provide for a large variety of positioning options, the assembly 10 may also be configured so that the arm 30 may be rotated to a degree greater than 90°, such as for example around a full 180°. For example, some embodiments of the assembly 10 may be configured so that the arm 30 may be pivoted to and secured at a first space-saving position that forms a substantially 0° angle with the wall and a second space-saving position that forms a substantially 180° angle with the wall. Embodiments of the assembly 10 may also be configured such that the arm 30 may be pivoted to and secured at a locking position that forms a substantially 135° angle with the wall. For purposes of the present disclosure, all angles over 90° should be understood as being relative to the axis (parallel to the wall) that coincides with the space-saving position designated as 0°. In those embodiments where two space-saving positions are provided, either one may be selected as the 0° position from all angles are measured.

In the embodiment shown in the Figures, for example, the assembly 10 is configured so that the arm 30 may be pivoted to and secured at a first locking position that forms a substantially 45° angle with the wall, a second locking position that forms a substantially 90° angle with the wall, or a third locking position that forms a substantially 135° angle with the wall. The assembly 10 is also configured so that the arm 30 may be pivoted to and secured at a first space-saving position that forms a substantially 0° angle with the wall and a second space-saving position that forms a substantially 180° angle with the wall.

The assembly 10 may be configured so that the arm 30 may be pivoted to and secured at the one or more space-saving positions and the one or more locking positions in any number of manners. In some embodiments, such as that shown in the Figures, the lower base plate 24 of the mounting bracket 20 may be provided with a plurality of notches. Each of the series of notches may be configured to accept a portion of the proximal end 31 of the arm. Each of the series of notches may also be configured so that when the portion of the proximal end 31 of the arm is secured in that notch, the arm is positioned in either a space-saving position or a locking position, as described above. Accordingly, each of the plurality of notches can be defined as a space-saving notch 41 or a locking notch 42.

For example, in some embodiments, the mounting bracket 20 may comprise any combination of: a notch 51 that is configured to position the arm 30 at an angle of substantially 0° with the wall, a notch 52 that is configured to position the arm at an angle of substantially 45° with the wall, a notch 53 that is configured to position the arm at an angle of substantially 90° with the wall, a notch 54 that is configured to position the arm at an angle of substantially 135° with the wall, and a notch 55 that is configured to position the arm at an angle of substantially 180° with the wall.

Accordingly, the assembly 10 may be configured so that the position of the arm 30 may be changed by (1) moving the proximal end portion 31 of the arm upward and out of a first notch, (2) rotating the arm to a different position in which the proximal end portion of the arm is aligned with a second notch, and (3) moving the proximal end portion of the arm downward into the second notch. In this way, one may easily position the arm 30 in any of the one or more space saving positions or any of the one or more locking positions, depending on the desired use of the assembly 10. For example, when a user wishes to secure a bicycle to the assembly 10, the user may move the arm 30 from a space-saving position to a locking position. Once the arm has been secured in one of the one or more locking positions, the user may secure the bicycle to the distal end 32 of the arm, such as with a lock. When the user would again like to ride the bicycle, the user may remove the lock in order to detach the bicycle from the distal end 32 of the arm, move the arm 30 from the locking position to a space-saving position, and secure the arm in the space-saving position.

The assembly 10 is also configured to be mounted in a user-friendly manner. For instance, a user need only determine the desired mounting location on a wall, place the mounting bracket 20 in the desired location, and then mark, such as with a pencil, the position of the mounting holes 21 on the wall. After drilling holes for the anchors, the anchors are inserted through the mounting holes 21 into the wall and tightened. Because only one mounting bracket 20 is attached to the wall, the risk of problems associated with misalignment and the like may be avoided. The arm 30 may then be pivotably attached to the mounting bracket 20 by inserting the tubular portion of the arm 34 onto the hinge pin 25 and then fastening the hinge pin to the mounting assembly, such as between the upper base plate 23 and the lower base plate 24. Similarly user-friendly, removal of the arm 30 may be accomplished by unfastening and removing the hinge pin 25 from the mounting bracket 20, thereby releasing the arm 30. This makes storage of the arm 30, such as may be desirable during certain seasons, events, and the like, efficient and simple.

Although the embodiments of the presently disclosed technology described herein refer to the parking of conventional bicycles, it is also contemplated that embodiments of the presently disclosed technology may be configured for the secured parking of various specialized bikes or other transportation devices, such as tricycles, rickshaws, four-wheeled bikes, recumbent bikes, electric-assist bikes, tandem bikes, arm-pedaled bikes, scooters (manual, electric, and/or motorized), mopeds, Segways®, and the like.

It can be seen that the described embodiments provide a unique and novel bicycle rack that has a number of advantages over those in the art. While there is shown and described herein certain specific structures embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. An assembly for the parking of one or more bicycles, comprising:
   a. a mounting bracket configured for attachment to a wall; and
   b. an arm, the proximal end of the arm being pivotally attached to the mounting bracket and the distal end of the arm having at least one opening configured for the attachment of one or more bicycle locks;
   wherein the assembly is configured so that the arm may be secured in at least
      (1) one or more space-saving position in which the arm is substantially parallel with the wall, and
      (2) one or more locking position in which the arm is positioned at an angle with the wall, the angle being suitable for the locking of a bicycle to the arm;
   wherein the mounting bracket comprises an upper base plate and a lower base plate;
   the lower base plate comprises a plurality of notches, each of the plurality of notches being configured to accept a portion of the proximal end of the arm to secure the arm in one of a space-saving position or a locking position; and
   the proximal end of the arm comprises a notch that mates with one of the plurality of notches on the lower base plate when the arm is secured in a space-saving position or a locking position; and
   wherein the assembly is configured for the locking of one or more bicycles in a manner that both front and rear wheels of each of the one or more bicycles are in contact with the ground.

2. The assembly of claim 1, wherein the assembly is configured so that the arm may be secured in more than one locking position.

3. The assembly of claim 1, wherein the assembly is configured so that the arm may be secured at a locking position that forms a substantially 45° angle with the wall.

4. The assembly of claim 3, wherein the assembly is configured so that the arm may also be secured at a locking position that forms a substantially 90° angle with the wall.

5. The assembly of claim 4, wherein the assembly is also configured so that the arm may be secured at a locking position that forms a substantially 135° angle with the wall.

6. The assembly of claim 1, wherein the assembly is configured so that the arm may be secured at a first space-saving position and a second space-saving position, the first and second space-saving positions being located on opposite sides of the bracket.

7. The assembly of claim 1, in which the mounting bracket comprises an upper base plate and a lower base plate; and
   the proximal end of the arm is pivotally attached to the mounting bracket between the upper base plate and the lower base plate.

8. The assembly of claim 7, in which the mounting bracket comprises a hinge pin that spans between the upper base plate and the lower base plate; and
   the proximal end of the arm is adapted to pivot about the hinge pin.

9. The assembly of claim 8, in which the hinge pin is attached to the mounting bracket with a tamper-resistant fastener.

10. The assembly of claim 1, in which the assembly is configured so that the arm may be pivoted between a first position and a second position by
    moving the proximal end portion of the arm upward out of a first notch,
    pivoting the arm to a position in which the proximal end portion of the arm is aligned with a second notch, and
    moving the proximal end portion of the arm downward into the second notch.

11. The assembly of claim 1, in which at least the distal end of the arm comprises a thermoplastic coating.

12. The assembly of claim 1, in which the length of the arm between the proximal end and the distal end is less than thirty inches.

13. The assembly of claim 12, in which the vertical span between a top of the arm and a bottom of the arm is less than fifteen inches.

14. The assembly of claim 13, in which the distal end of the arm spans a greater height than the proximal end of the arm.

15. The assembly of claim 1, in which the opening configured for the attachment of a bicycle lock is a circular opening.

16. The assembly of claim 1, in which the mounting bracket is configured to be mounted to the wall using either a wedge anchor or a sleeve anchor.

17. The assembly of claim 1, wherein the assembly is configured for a U-lock to be attached to the distal end of the arm and to a frame of a bicycle to secure the bicycle frame to the assembly.

18. The assembly of claim 1, wherein the assembly is configured for the locking of two bicycles, one bicycle on each side of the arm.

19. The assembly of claim 1, wherein the assembly is configured for the locking of two bicycles, one bicycle on each side of the arm; and
    wherein the assembly is configured so that each of the two bicycles may be secured to the distal end of the arm using a U-lock, such that the U-lock encloses a portion of the distal end of the arm and a frame of the bicycle.

20. An assembly for the parking of one or more bicycles, comprising:
    a. a mounting bracket configured for attachment to a wall; and
    b. an arm, the proximal end of the arm being pivotally attached to the mounting bracket and the distal end of the arm having at least one opening configured for the attachment of one or more bicycle locks;
    wherein the assembly is configured so that the arm may be secured in at least
      (1) one or more space-saving position in which the arm is substantially parallel with the wall, and
      (2) one or more locking position in which the arm is positioned at an angle with the wall, the angle being suitable for the locking of a bicycle to the arm;
    wherein the mounting bracket comprises an upper base plate, a lower base plate, and a hinge pin that spans between the upper base plate and the lower base plate;
    the proximal end of the arm is adapted to pivot about the hinge pin;
    the lower base plate comprises a plurality of notches, each of the plurality of notches being configured to accept a portion of the proximal end of the arm to secure the arm in one of a space-saving position or a locking position; and
    the proximal end of the arm comprises a notch that mates with one of the plurality of notches on the lower base plate when the arm is secured in a space-saving position or a locking position.

* * * * *